Patented June 1, 1937

2,082,284

UNITED STATES PATENT OFFICE 2,082,284

PROCESS FOR EXTRACTING METALS FROM ORES

Carl Goetz, Berlin, Germany

No Drawing. Original application March 27, 1933, Serial No. 663,100. Divided and this application June 17, 1935, Serial No. 27,124. In Germany April 1, 1932

6 Claims. (Cl. 75—6)

This application is a division of application Ser. No. 663,100, filed Mar. 27, 1933. Said patent has since become Patent 2,045,226, granted June 23, 1936.

This invention comprises a process which is a development of my process for obtaining metals from bituminous ores by heat treatment in the absence of air and of my process for obtaining metals from sulphidic ores by heat treatment in the presence of solid, liquid or gaseous hydrocarbons in absence of air. By bituminous ores are meant ores which, apart from the ore content, can be spoken of as bituminous rock, more particularly as bituminous shale, e. g. Mansfeld copper shale, which contains 10–17% of bitumen hydrocarbons.

In the course of work carried out to bring these processes to perfection it has been found that with certain presuppositions the metals can also be liberated from their compounds without the action of the gases which are evolved from bitumen, or gases of other kinds, if the ores are subjected to a heat treatment in an inert gas with exclusion of air. The metals can be liberated from sulphidic and arsenical ores in the metallic form and conglomerated to coarser particles capable of being readily further worked up, if a definite quantity of iron is present in the form of iron oxides or metallic iron. For this purpose the iron-containing ore in the form of small to fine granules is subjected to several hours' heat treatment with exclusion of air in an inert gas or in an inert gas mixed with a combustible gas such as hydrocarbons, carbon monoxide and the like.

It has been found that besides streams of inert gas, alone or mixed with reducing gas, any other non-oxidizing gas can be used for carrying out the process. When using such gases also the presence of iron oxides, metallic iron, or substances like carbonate of iron and hydroxide of iron which form oxide of iron when heated, acts pre-eminently with a desulphurizing effect. Among others, carbon monoxide, hydrogen, illuminating gas, water gas or mixtures of such gases, or reducing gases mixed with steam have proved to be suitable reducing gases. By "illuminating gas" is meant the gas obtained on distilling mineral coal; the particular gas used by the applicant in his experiments has the following composition:

3–4% $CO_2$; 0.2% $O_2$; 17–18% CO; 48–50% $H_2$; 16–18% $CH_4$

In the case of copper glance which has been mixed with iron oxides the yield of metallic copper in the case of these gases is, other conditions being equal, the same as when using an inert gas stream or a stream of inert gas mixed with reducing gas. Reducing gases are frequently easier to procure and cheaper than inert gases or mixtures of these with reducing gases. It is true they also exert a desulphurizing effect without any iron being present, but then considerably larger quantities of gas and longer reaction times or substantially higher temperatures are necessary. For example, from 5 grams of finely ground copper glance which has been exposed for two hours at 600° C. to a steam-illuminating gas stream flowing at a rate of 12 litres of gas per hour and 125 cc. of steam per hour, only 0.9% of metallic copper is obtained whilst when using double the quantities of gas and steam only 3.7% of copper are obtained in the same time and at the same temperature.

If the same quantity of copper glance is mixed with iron oxides in the ratio of 1:1, then other conditions being the same, after 2 hours' treatment at 600° C. in a stream of illuminating gas and steam of 12 litres of gas per hour and 125 cc. of water per hour 65.2% of metallic copper are produced. Since the reducing gases are only very slightly used in this process, they can be employed repeatedly, if necessary being each time purified from the sulphur dioxide or sulphuretted hydrogen amounting to only a few percent of the original sulphur content of the ore. The best results are obtained at temperatures lying round about 600° C. and by a further treatment at temperatures rising to about 800° C., but the reactions already commence at lower temperatures. The temperatures must not be carried as high as the melting points of the minerals coming into question or of the eutectic mixtures present. It has been proposed to dissociate antimony sulphide in a closed retort at temperatures of 1500° C., sulphur vapours escaping and the separated antimony flowing back into the dissociation chamber. It is also known to decompose pyrites and other sulphidic ores in indifferent gases into their components by heating to fusion temperatures of 1500 to 2000° C. Further, it is known to fuse partially roasted copper matte or copper ore with silicic acid and to obtain an enriched copper regulus, iron exerting a desulphurizing effect on lead sulphide and a double silicate of lead and iron then being formed. The present invention is a substantial improvement over these known processes since all the latter operate with substantially higher temperatures and employ liquid furnace charges.

The process is suitable for every kind of sulphide and arsenide ore, more particularly for sulphidic copper ores, which in addition also contain noble metals such as gold and silver. The gold and silver content of those ores which are to be regarded as gold- and silver-bearing copper ores also acts particularly favourably. Among other ores, ores of the Boliden Mining Comany were treated with the greatest success. The ores consisted of gold- and silver-containing iron pyrites and arsenical pyrites the copper being present in the form of copper pyrites. The composition of the ore was as follows: 41.3% S, 1.88% Cu, 4.13% As, 32 g/t Ag and 4 g/t Au. This ore was subjected to a heat treatment in a current of nitrogen, first of all for 6 hours at 600° C. and then for 4 hours at 800° C. Whereas no noble metals could be seen in the original ore under the microscope, coarse particles of free gold and free silver could be detected in the heat-treated material after 10 hours' treatment, and indeed already after 6 hours. By the treatment at 600° C. the copper content was for the greatest part likewise liberated in the form of metal, but a part remained combined in the form of copper pyrites at this temperature. In the further treatment up to 800° C., this copper glance also was for the most part decomposed with liberation of metallic copper, whilst the particles of noble metal are coarsened further.

The process can also be employed for sulphidic and arsenic ores of every kind. Iron must be added in the form of iron oxides or other substances for which sulphur at the temperatures coming into question has a greater affinity than for the metals being recovered, or even iron sulphide may be added. The copper can be wholly, or for the most part, liberated in the form of metal from copper glance, which undergoes no change when heated with the exclusion of air, by adding iron oxide powder. The sulphur liberated deposits in the form of elementary sulphur or combines with the iron. Sulphur dioxide escapes as well. The process can also be employed together with a process for obtaining metals from bituminous ores by heating the same with exclusion of air. The gases forming from the bitumen, or other gases, need then be used to only a small extent for the desulphurization or dearsenification of the ores, whilst the greater part of the metal is already liberated without the influence of these gases.

In the treatment of artificial and natural bornite in a stream of nitrogen, as well as in a stream of illuminating gas and steam, it was found that this ore is no longer stable at temperatures above 600° C. but is decomposed into metallic copper and copper sulphide, (copper glance). From artificial bornite, containing 98% copper in the form of $Cu_3FeS_3$, 0.7% copper in the form of $Cu_2S$, 0.3% metallic copper, and 1% copper as copper pyrites and containing no other constituents, 26.9% of metallic copper were liberated after one hours' treatment of the finely granulated ore in a porcelain boat in a stream of nitrogen, 2.6% of copper were combined in the form of bornite and 70.5% of copper in the form of copper sulphide. The reaction is accelerated if finely divided metallic iron is admixed with the bornite. Artificial bornite of the kind described above mixed with metallic iron in the proportion of 1:1 already yielded 55% copper in the form of metal after 2 hours' treatment in a porcelain boat in a current of nitrogen. (Copper glance alone, as stated in "Metall und Erz", 1932, page 112, is not decomposed when heated in an inert gas up to 1310° C.)

Natural bornite consisting of 70% $Cu_3FeS_3$, 7.0% $Cu_2S$, 13% $FeS_2$ and 10% $Fe_2O_3$ after two hours' treatment in a boat made of brass gauze in a stream of illuminating gas and steam at 600° C. yielded 85.4% metallic copper and 14.6% in the form of $Cu_2S$, no more $Cu_3FeS_3$ being present. After two hours' treatment of natural bornite at 600° C. in a porcelain boat in a stream of illuminating gas and steam only 74.4% of metallic copper are formed. After two hours' treatment at 800° C. in a porcelain boat in a stream of illuminating gas and steam 78.1% of metallic copper, no bornite, and 21.9% of copper in the form of $Cu_2S$ were present. It follows from this that the streaming effect of the gas is of advantage for carrying out the reaction.

Artificial copper glance (chemically pure copper sulphide) showed after treatment with the same quantity of a stream of illuminating gas and steam as the bornite for two hours only 0.9% of metal, and after 2 hours at 800° C. only 19.8%. If the copper glance is mixed with iron oxides, however, then considerably better results are obtained by the treatment even in an inert gas (nitrogen) at the same treatment temperatures and with the same treatment times. $Cu_2S$ intimately mixed with artificial iron oxides in the proportion of 1:1 and heated in a porcelain boat for two hours at 600° C. in a stream of nitrogen already yielded 46.9% in the form of metal whilst 53.1% remained combined in the form of $Cu_2S$. No copper pyrites or bornite was formed.

$Cu_2S$ and finely divided metallic iron mixed in the proportion of 1:1 heated in a porcelain boat for two hours in a stream of nitrogen at 600° C. yielded 64.2% of metallic copper and 35.8% of copper in the form of $Cu_2S$. No sulphur was liberated but was taken up by the iron with the formation of ferrous sulphide. After two hours' treatment of the same mixture in a porcelain boat at 800° C. in a stream of nitrogen 72% of metal were formed. After two hours' heat treatment of the $Cu_2S$-metallic iron mixture (ratio 1:1) in a boat of brass gauze in a stream of nitrogen, 99.2% metal were formed at 600° C., whilst 95% were formed at 800° C.

It follows from this that the streaming effect of the inert gas is of importance. If it is desired to obtain such effects without streaming gases the copper ore-iron oxide mixture must be extremely finely comminuted. If, for example, copper glance, which has been comminuted to a mesh of 10,000, is mixed with metallic iron of the same granule size in the ratio of 1:1 and the mixture subjected to two hours' treatment in the absence of air at a temperature at 600° C. in an atmosphere of nitrogen, then already 80% of metallic copper are formed, but, of course, in a very much finer state of subdivision than is produced by the treatment of coarser granules in a stream of gas.

The present process is also of considerable importance for ores of gold, silver, and copper which contain arsenic. These ores can be very simply treated since the arsenic is wholly or for the greater part combined with the iron or iron sulphide whilst the useful metals, such as gold, silver, copper and so forth are liberated in the metallic form. This is of particular importance for ores of the Swedish Boliden ore type, the economical treatment of which has hitherto been beset with difficulties since the large quantities of arsenic which arise cannot be worked. The combination of the arsenic is brought about by admixing iron in the form of finely ground iron oxides, or the like. Other substancess can also be used in place of iron oxide. For example, calcium oxide is a suitable such substance. Treatment in a carbon monoxide stream or a stream containing carbon monoxide and nitrogen is particularly suitable for such ores.

A temperature of 600° C. has been found to be particularly favourable, but equally good results are obtained at higher and lower temperatures; it is advisable, however, to avoid temperatures at which resulphurizing of the metals to be obtained takes place. This temperature for copper is about 900° C.

In the treatment of Boliden ores, which have been intimately admixed with finely ground iron oxide in the proportion of 1:1 and comminuted to a granule size of 1 mm., no arsenic escaped at all in six hours' treatment at 600° C., only very small quantities in ten hours' treatment, whilst copper, gold and silver were liberated in the form of coarse metal granules.

The addition of iron oxide may also be effected by dead-roasting a part of the ore and adding it to that portion of the ore which has not been dead-roasted.

Further, the treatment time is of importance. It has been found that if the treatment time is too long the equilibrium is shifted into the opposite direction and re-formation of copper sulphide takes place. The liberated elementary metals can be worked up without difficulty either by gravitational methods or by flotation, or by chemical methods such as lixiviation and so forth. More particularly the particles of ore, subdivided in a state of colloidal fineness, may be conglomerated to such coarse particles that they offer no further dificulty to the working up operations. It is particularly noteworthy that the granule size can be regulated according to the time of treatment in such a way that coarser particles are formed with longer treatment times or higher temperatures. This fact is of particular importance for the recovery of noble metals from Boliden ores which hitherto could not be worked up at all. Since the metals to be obtained are present in the metallic form throughout the heat-treated material they can be worked up without difficulty.

What I claim is:—

1. A process for obtaining non-ferrous metal from iron-containing ores thereof of sulphidic or arsenical nature, consisting in adding iron oxide to the ore in order to rectify the deficiency of this metal in the ore, and in heating the mixture in a non-oxidizing gas stream at an elevated temperature which is substantially below the melting point of the ore, whereby the sulphur and arsenic combine with the iron which is present and the non-ferrous metal is liberated in its elementary state and conglomerated to coarse particles.

2. A process for obtaining non-ferrous metal from iron-containing ores thereof of sulphidic or arsenical nature, consisting in adding iron oxide to the ore in order to rectify the deficiency of this metal in the ore, and in heating the mixture in a stream of inert gas at an elevated temperature which is substantially below the melting point of the ore, whereby the sulphur and arsenic combine with the iron which is present and the non-ferrous metal is liberated in its elementary state and conglomerated to coarse particles.

3. A process for obtaining non-ferrous metal from iron-containing ores thereof of sulphidic or arsenical nature, consisting in adding iron oxide to the ore in order to rectify the deficiency of this metal in the ore, and in heating the mixture in a stream of inert gas mixed with a reducing gas at an elevated temperature which is substantially below the melting point of the ore, whereby the sulphur and arsenic combine with the iron which is present and the non-ferrous metal is liberated in its elementary state and conglomerated to coarse particles.

4. A process for obtaining non-ferrous metal from iron-containing ores thereof of sulphidic or arsenical nature, consisting in adding iron oxide to the ore in order to rectify the deficiency of this metal in the ore, and in heating the mixture in a stream of reducing gas at an elevated temperature which is substantially below the melting point of the metal contained therein, whereby the sulphur and arsenic combine with the iron which is present and the non-ferrous metal is liberated in its elementary state and conglomerated to coarse particles.

5. A process for obtaining non-ferrous metal from iron-containing ores thereof of sulphidic or arsenical nature, consisting in adding finely ground iron oxide to the ore in a quantity such that the mixture contains sufficient iron to combine with the greater part of the sulphur and of the arsenic, and in heating the mixture in a non-oxidizing gas stream at an elevated temperature which is substantially below the melting point of the ore, whereby the sulphur and the arsenic combine with the iron which is present and the non-ferrous metal is liberated in its elementary state and conglomerated to coarse particles.

6. A process for obtaining non-ferrous metal from iron-containing ores thereof of sulphidic or arsenical nature, consisting in dead-roasting some of the ore, mixing the dead-roasted product with ore which has not been so treated, and in heating the mixture in a stream of inert gas at an elevated temperature which is substantially below the melting point of the ore, whereby the sulphur and arsenic combine with the iron which is present and the non-ferrous metal is liberated in its elementary state and conglomerated to coarse particles.

CARL GOETZ.